UNITED STATES PATENT OFFICE.

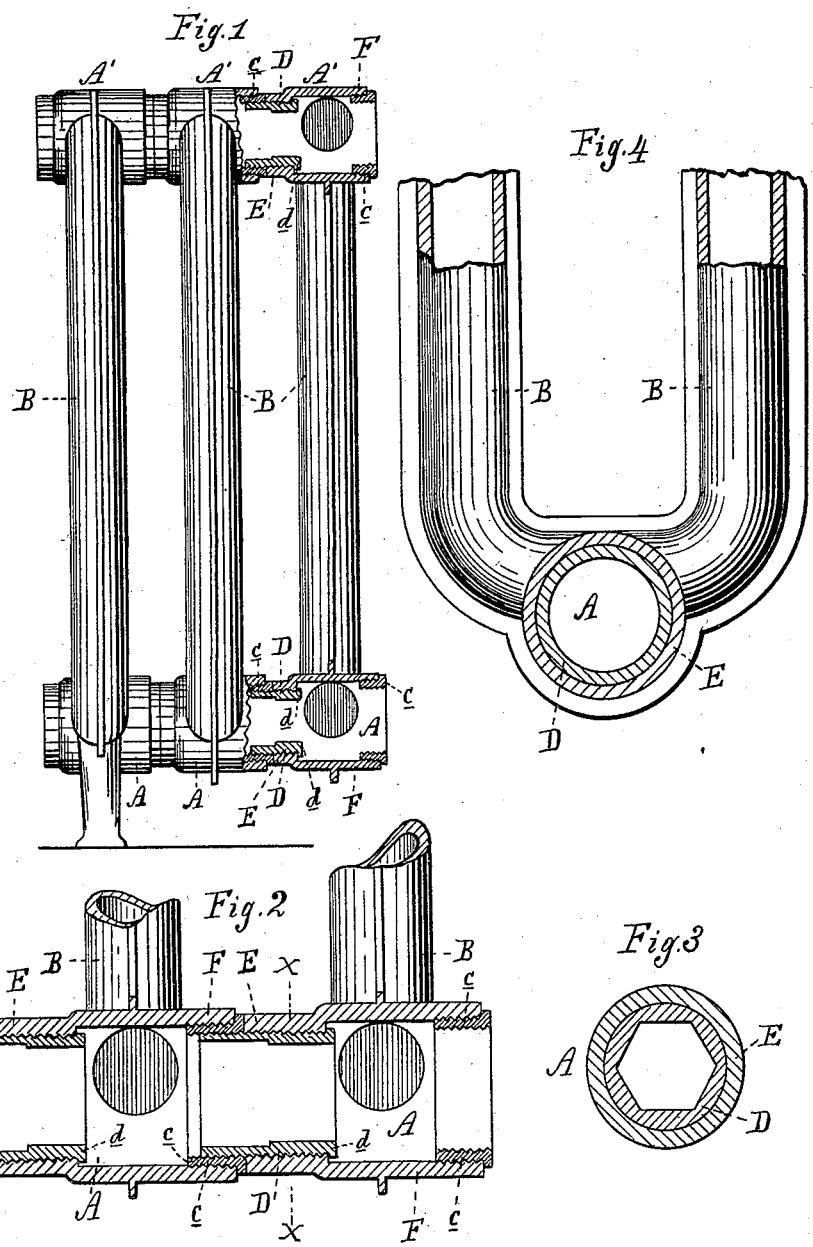

JAMES McEWAN, OF DETROIT, MICHIGAN.

COUPLING FOR PARALLEL PIPES.

SPECIFICATION forming part of Letters Patent No. 398,068, dated February 19, 1889.

Application filed March 27, 1888. Serial No. 268,710. (No model.)

*To all whom it may concern:*

Be it known that I, JAMES MCEWAN, a citizen of Great Britain, residing at Detroit, in the county of Wayne and State of Michigan, have invented a new and useful Improvement in Couplings for Parallel Pipes, of which the following is a specification.

The object of my invention is a coupling, by means of which cylinders lying parallel with one another may be connected at either or both ends by a hollow coupling, through which liquids or gases may circulate freely in a complete circuit.

My invention is especially adapted for use in heating-radiators in which steam or hot water is used.

Figure 1 represents, partly in elevation and partly in sections, a portion of such a radiator, in which the upright pipes are joined at the top and bottom ends by means of my coupling. Fig. 2 is an enlarged sectional view showing the coupling in detail. Fig. 3 is an end view through the line $x\ x$ of Fig. 2. Fig. 4 shows the connection of the upright pipes to the coupling-pipe.

A represents a short piece of pipe, from which spring any number of pipes at right angles to its axis, all of them communicating with the interior of the pipe A. The short pipe A has each end screw-threaded on its interior. The internal diameter of the end E is somewhat smaller than the internal diameter of the end F. At the inner end of the screw-threads at the end E the diameter of the pipe suddenly increases to form an abutment, against which is pressed a circular flange, $d$, at the end of an externally-threaded nipple, D.

$c$ is an externally and internally threaded bushing having a flange, $b$, on one end. The external thread of $c$ fits closely to the interior thread of the end F of the pipe A, and the interior thread of the bushing $c$ fits closely upon the outside of the nipple D.

The difference in diameter between the ends E and F of the pipe A is sufficient to permit the flanged nipple D to pass freely through the end F into position to be screwed into the threads on the interior of the end E.

The nipple D may have the opening through it of a circular form or of a polygonal form to enable it to be better turned by means of a wrench inserted into it.

The parallel pipes B B B are formed with similar connecting-pipes A A A A' A' A' on either end, and by means of this coupling it can be readily seen that any number of them can be connected together in a continuous series.

To form the connection, it is only necessary to place the nipple D within the opening of the pipe A, follow it with the bushing $c$, which is screwed down to place, then bring the second pipe of the series so that the opening through the coupling-pipes will register and screw in the nipple D, connecting the second pipe of the series with the first, and thus continue the operation until the series is complete.

Having thus described my invention and its mode of operation, what I claim as novel, and desire to have secured to me, is—

A coupling-pipe connected with and at right angles to the main or circuit pipe, said coupling-pipe being screw-threaded interiorly on both ends but having the interior diameter at one end larger than at the other, combined with a bushing screw-threaded on the outside and on the inside, the interior diameter of the bushing being equal to the interior diameter at the smaller end of the coupling-pipe, and a nipple screw-threaded on its outside to fit the interior of said bushing and the smaller end of the coupling-pipe, substantially as and for the purposes described.

JAMES McEWAN.

Witnesses:
CHARLES F. BURTON,
CHARLES H. FISK.